March 21, 1967   J. MICHAEL   3,309,730
FISH FILLETING MACHINES WITH DORSAL KNIVES, BELLY KNIVES, RIB
KNIVES AND GUIDES ARRANGED THEREBETWEEN
Filed March 5, 1965
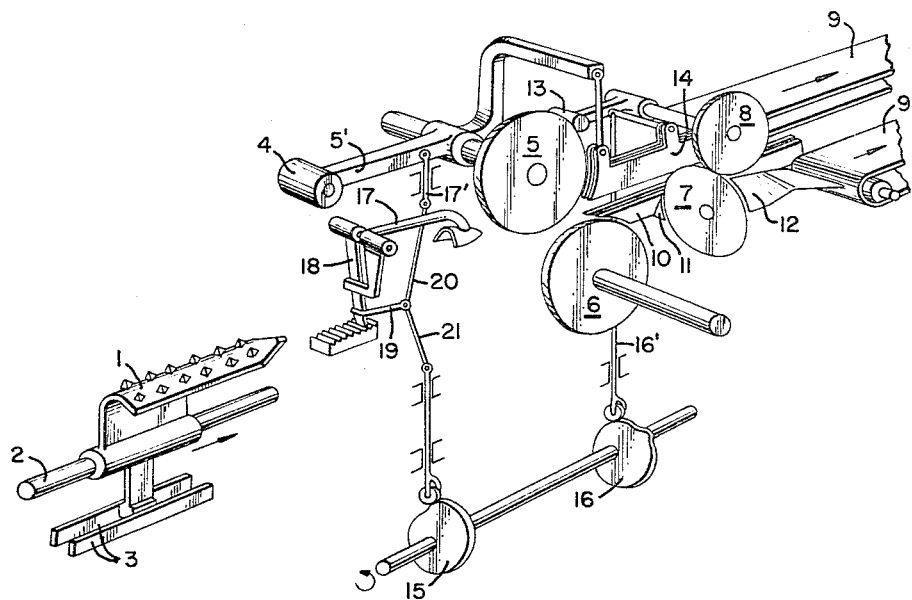
INVENTOR
JOHANNES MICHAEL United States Patent Office 3,309,730
Patented Mar. 21, 1967

3,309,730
FISH FILLETING MACHINES WITH DORSAL KNIVES, BELLY KNIVES, RIB KNIVES AND GUIDES ARRANGED THEREBETWEEN
Johannes Michael, Harmsdorf, via Ratzeburg, Germany, assignor to Nordischer Maschinenbau Rud. Baader, Lubeck, Germany, a firm
Filed Mar. 5, 1965, Ser. No. 437,419
Claims priority, application Germany, Mar. 7, 1964, N 24,575
1 Claim. (Cl. 17—4)

The invention relates to a fish filleting machine with a set of circular dorsal knives behind which pairs of guides are arranged for guiding the dorsal spike bones, a set of circular belly knives and a set of circular rib knives with pairs of guides arranged between and behind them for guiding the belly spike bones, as well as a gap between the dorsal and belly guides for allowing the passage of the vertebrae of the spinal chord, and having as its object to adapt the tools and guides more effectively to the varying dimensions of the vertebrae of the fish itself as well as to the different fish sizes.

It is known to swing tools out of their working position for example, to allow the passage of a tail clamp, it is likewise known to switch tools and guides into and out of their working position for carrying out a working operation and it is furthermore known to adapt tools and guides arranged in pairs to the different thickness of the dorsal vertebrae according to the fish size and their position in the fish by changing the spacing of these pairs of tools and guides. Hereby the tools and guides arranged on the belly and back side leave a free space between them which allows the thickest vertebra of the largest fish to pass without hindrance. This means however that the spinal chord of the smallest fish floats in this guide path.

It has now been found that it is possible to prevent the smallest fish to float in this manner and nevertheless to bridge the differences in the spine thicknesses of a fish far better if the tools and guides arranged underneath the space allowing the passage of the spine are rigid and the tools and guides arranged above the space are yieldable so that the size of the space can be adapted to the actual dimensions of the spine. The fundamental difference as compared with the known devices consists in that the present invention enables the space between the knives of a pair or between a pair of guides to remain constant and only changes the height of the upper pairs of knives and guides. In order to adapt the gap left free between the guides and tools on the belly and back sides to the thickness of the spine which increases from the tail towards the head end of the fish, curved surfaces extending synchronously with the feeding element are employed which lift the pivoted knife arms and the guides connected therewith. This results not only in better adaptation and prevention of the floating of smaller fishes, but also in a far simpler construction of the whole device, excellent guiding of the fishes and consequently a performance when cutting fillets which can otherwise only be attained with very complicated controlling mechanisms.

If a feeding element such as for example a saddle is used, the space between the guides for the belly and back sides serves as passage for the feeding element and the tools and guides above the feeding element receive their basic adjustment in height according to the position of the feeding element. This basic adjustment is intended for the smallest fishes of a size group. The adaptation of this basic adjustment to the larger fishes is effected by actual adjustment of the tools and guides according to the fish length, the value of which is obtained by measuring the fish. Thus once the basic position has been set for the smallest fishes, the correction of this basic position is easily attainable for all sizes of the group size in question. The adaptation of the gap to the thickness of the dorsal vertebrae increasing from the tail to the head is also effected in the manner above described when using a feeding element.

Thus the machine set to the smallest fish, due to the yieldability of the upper tools and guides and the curve control of the tools and guides, regulates the adaptation to the thicknesses of the vertebrae of the largest fishes and to the thickness of the spine of each individual fish increasing from tail to head. In many cases, however, it is advantageous to superimpose a value obtained by measuring the fish size on the actual setting of the tools and guides, which value represents, so-to-speak a fine adjustment of the tools and guides, for example in adaptation to special characteristics of certain kinds of fishes. This may be effected, for example, by adjusting a setting element according to the maximum height of the back of the fish, whereby the length of the transmission element actuated by the cutting tools and guides is changed.

An arrangement of tools with guides between them and a transporting element for the fish is illustrated diagrammatically by way of example in the only figure of the accompanying drawing.

For the sake of simplicity, drives, guides and chains for the transporting element and the guides in front of the pairs of filleting knives are omitted.

A pushing saddle 1 carried by a round guide 2 and guided between rails 3, carries through the filleting machine the decapitated fish with opened belly cavity, straddled in its belly cavity. A pair of circular knives 5 connected with arm 5' pivotable about an axle 4, cuts the fillets from the back free from the vertebrae, a pair of rigidly mounted circular knives 6 cuts the fillets free from the tail end to the belly cavity, a pair of flank knives 7 severs the fillets from the vertebral appendages and ribs in the region of the belly cavity and a pair of circular knives 8 severs the fillets completely from the skeleton, the fillets being then delivered by conveyor belts 9. Between the tools on the belly side a pair of guides 10 for collecting the spine are rigidly and unyieldably arranged, in front of the flank knives 7 flaps 11 controlling the belly flap cut and behind these, guides 12 deflecting the fillets. To adapt the gap left free between the belly guide consisting of the saddle 1 and dorsal guides and the tools 6, 7 and 8 to the thickness of the dorsal vertebrae increasing from the tail to the head end of the fish, cams 15 and 16 are provided. These lift the knives 5 and 8 pivotable about the axles 4 and 13 and consequently also the pairs of guides 14 carried thereby.

By means of a measuring lever 17 the greatest fish height is measured and thereby an adjusting element 18 is set which carries the pivot axle of an intermediate link 19. The lever 17 is connected with the arms 5' by a connecting member 17'. The length of the divided thrust rod 20, 21 varies according to the position of the adjusting or setting element 18 and as a result the basic setting of the pair of circular knives 5 and guides 14 is changed. The cam 16 is in contact with the knives 8 by a connecting member 16'. The means for measuring the fish, storing and transmitting the measurement values are only shown diagrammatically. The return and cancellation can be effected in known manner.

What is claimed is:

A fish filleting machine, comprising a pushing saddle for a decapitated fish with open belly cavity, a round guide carrying said saddle, rails guiding said saddle with said fish along a predetermined path, a pair of circular knives located in said path for cutting fillets from the vertebrae of said fish, an axle spaced from said knives, means connecting said knives with said axle for pivoting said knives about said axle, a pair of rigidly mounted circular knives located in said path for cutting fillets from the tail end to the belly cavity of said fish, a pair of flank knives located in said path for severing fillets from the ribs of said fish, a pair of circular knives located in said path for completely removing said fillets, conveyor belts located in said path and receiving the removed fillets, guides located in said path for collecting the spine of said fish, flaps located in front of said flank knives for controlling the belly flap of said fish, guides located behind said flank knives for deflecting said fillets, a measuring lever located in said path for measuring the height of the fish, an adjusting element connected with said measuring lever and actuated thereby, means connecting said measuring lever with the first-mentioned means, a link connected with said adjusting element, a divided thrust rod connected with said link, a cam engaging said thrust rod, guides located in said path and connected with the first-mentioned means, another cam, and means contacting the second-mentioned cam and engaging the third-mentioned pair of knives, whereby the positions of the first and third-mentioned pair of knives and of the last-mentioned guides are adjusted.

References Cited by the Examiner
UNITED STATES PATENTS

| | | | |
|---|---|---|---|
| 2,704,378 | 3/1955 | Schlichting | 17—4 |
| 2,893,052 | 7/1959 | Schlichting | 17—3 |
| 3,116,512 | 1/1964 | Kloster et al. | 17—4 |
| 3,187,375 | 6/1965 | Williamson et al. | 17—3 |

LUCIE H. LAUDENSLAGER, *Primary Examiner.*